UNITED STATES PATENT OFFICE.

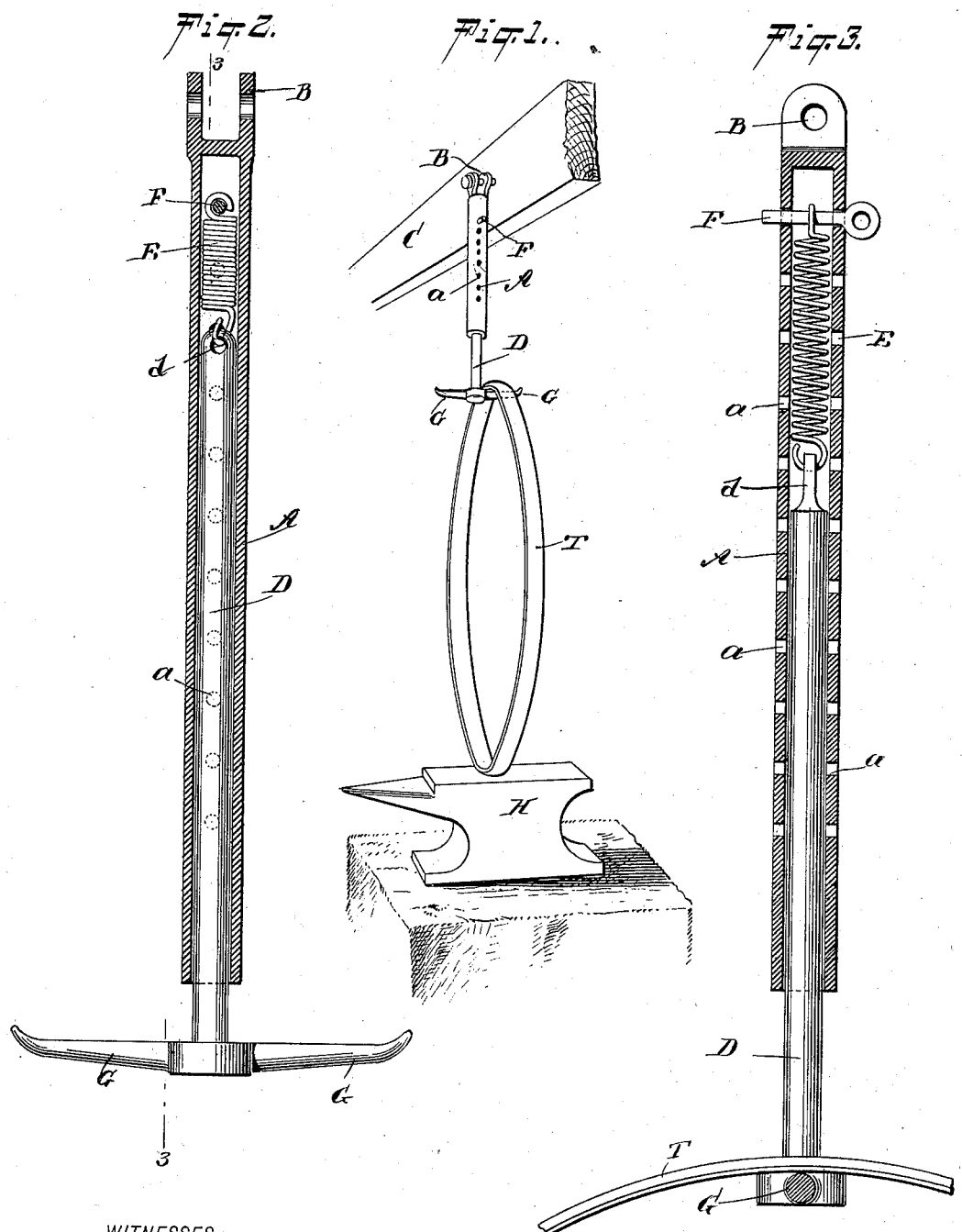

JOHN D. AITKEN, OF NORTHPORT, NEW YORK.

TIRE-HOLDER.

SPECIFICATION forming part of Letters Patent No. 611,546, dated September 27, 1898.

Application filed December 23, 1897. Serial No. 663,243. (No model.)

*To all whom it may concern:*

Be it known that I, JOHN D. AITKEN, of Northport, in the county of Suffolk and State of New York, have invented a new and Improved Tire-Holder, of which the following is a full, clear, and exact description.

My invention relates to an improvement in devices for blacksmiths' use intended to conveniently support a tire above the anvil, so as to carry most of the weight thereof and allow of its being easily manipulated by the blacksmith.

The invention consists of certain features which will be hereinafter described and claimed.

Reference is to be had to the accompanying drawings, forming a part of this specification, in which similar characters of reference indicate corresponding parts in all the views.

Figure 1 is a perspective view showing my device in use, and Figs. 2 and 3 are sectional elevations showing two positions of the device.

My invention comprises two principal parts, a tube A, which is provided with suspending means consisting of flanges B at its upper end, having a hole therethrough and adapted to be secured to any convenient support, and a bar D, sliding within said tube and provided at its lower end with side-extending hooks G to engage and support the tire. In addition to these and connecting the two is a spring E, by which the rod D is yieldingly supported. The tube A is provided with a series of holes $a$, adapted to receive a pin F, which supports the upper end of the spring E. The holes $a$ are arranged at short distances apart, and by means of them the device may be adjusted for tires of different diameter and weight. The rod D has a flange $d$ at its upper end, said flange being provided with a hole adapted to receive the lower ends of the spring E. The spring E is a spirally-coiled wire spring, having eyes formed in each end thereof, one of the eyes being adapted to engage with the flange $d$ of the rod D, and the other being adapted to receive the pin F. As a matter of convenience the rod D is shown as being provided with two hooks G, extending opposite each other, said hooks being formed by properly shaping a bar of iron and attaching the stem D thereto at its center. It is obvious, however, that only one hook may be used, if desired, and this may be formed in any convenient manner.

In using my device the upper end of the tube A is supported from some overhead object. For this purpose a beam or joist C is generally available, and if it is at the right height the tube A may be directly attached thereto by means of a bolt or spike passing through the holes in the flanges B. Where such a support is not available at the proper point, the tube may be supported by something which is devised as a substitute for the joist or in any suitable or convenient manner. The tube A should be adjusted at the point where it will suit the greater number of tires.

The device may be adjusted to accommodate tires of different diameter and weight by adjusting the position of the pin F. When the pin is in the upper of the holes $a$, it is in position for a tire of large diameter or of heavy weight. As the tire becomes smaller or lighter the pin F is dropped until it has reached the proper point.

In use the device is adjusted so that the tension of the spring E will nearly support the weight of the tire. The tire may thus be left supported upon the hook G and resting upon the anvil without requiring the assistance of the blacksmith to hold it in place. This leaves the blacksmith only the labor of adjusting the position of the tire to suit his needs without the necessity of supporting its weight or preventing its falling. In consequence of this one man is able to handle a tire with as much convenience as two could without such a device.

It is also evident that the rod D may be readily attached to the tube A and the spring E be interposed between the tube A and the object from which it is suspended, the same result being attained in either case. This, however, is considered as being the equivalent of my invention.

It is obvious that in using this device the tire may be turned upon the anvil. The spring E is sufficiently flexible to allow of considerable rotation. This contributes to the convenience of the device and allows the blacksmith to readily place the tire in any position desired.

Having thus described my invention, I claim as new and desire to secure by Letters Patent—

1. A tire-support for blacksmiths' use, comprising two bars, a spring connecting said bars, the attachment of said spring to the bars being adjustable longitudinally of the bars, a hook attached to the lower end of one bar and means for suspending the other bar, substantially as described.

2. A tire-support for blacksmiths' use, comprising a tube having a series of lateral pin-receiving holes, a bar slidable within said tube and having a side-extending hook upon its lower end, a spring attached to the upper end of said bar, and a pin adapted to pass through the holes in the tube and engage the upper end of the spring, substantially as described.

JOHN D. AITKEN.

Witnesses:
FRANK W. RYAN,
WILLIAM STARK.